US008794636B2

(12) United States Patent
Urakami

(10) Patent No.: US 8,794,636 B2
(45) Date of Patent: Aug. 5, 2014

(54) SELF-SEALING FLEXIBLE SEAL FOR SEALING INNER SURFACE OF TUBE AND MOVABLE BODY FOR INSIDE TUBE EQUIPPED WITH SAID SEAL

(75) Inventor: Fukashi Urakami, Kanagawa (JP)

(73) Assignee: Urakami LLC, Yokohama (JP)

( * ) Notice: Subject to any disclaimer, the term of this patent is extended or adjusted under 35 U.S.C. 154(b) by 50 days.

(21) Appl. No.: 13/515,688

(22) PCT Filed: Dec. 12, 2010

(86) PCT No.: PCT/JP2010/072294
§ 371 (c)(1), (2), (4) Date: Aug. 23, 2012

(87) PCT Pub. No.: WO2011/074502
PCT Pub. Date: Jun. 23, 2011

(65) Prior Publication Data

US 2012/0313326 A1 Dec. 13, 2012

(30) Foreign Application Priority Data

Dec. 14, 2009 (JP) ................................ 2009-282332

(51) Int. Cl.
*F16J 15/20* (2006.01)

(52) U.S. Cl.
USPC .......................................... 277/500; 277/534

(58) Field of Classification Search
USPC ......... 277/341, 342, 327, 323, 337, 500, 504, 277/534
See application file for complete search history.

(56) References Cited

U.S. PATENT DOCUMENTS

| | | | | | |
|---|---|---|---|---|---|
| 4,554,973 | A * | 11/1985 | Shonrock et al. | ............. | 166/192 |
| RE32,831 | E * | 1/1989 | Shonrock et al. | ............. | 166/135 |
| 6,796,380 | B2 * | 9/2004 | Xu | ............................... | 166/381 |

FOREIGN PATENT DOCUMENTS

| | | | |
|---|---|---|---|
| JP | 56-176093 | U | 12/1981 |
| JP | 06-066776 | A | 3/1994 |
| JP | 2003-225626 | A | 8/2003 |
| JP | 2004-293670 | A | 10/2004 |
| JP | 2006-314926 | A | 11/2006 |

* cited by examiner

*Primary Examiner* — Gilbert Lee
(74) *Attorney, Agent, or Firm* — Kubotera & Associates, LLC

(57) ABSTRACT

A self-sealing flexible seal includes a seal component A and a seal component B, each being hollow ball-like. In the portion of two pole parts of the each seal component, there is one annular opening per pole. The form of two seal components is similar figures, and two seal components are formed from a flexible material. The seal component A is arranged on the outside of the seal component B. The seal component A and the seal component B are arranged by a two-sheet pile, and are arranged in the state where it moreover contacted. Each of the seal component A and the seal component B possesses the slits of N pieces which have similar figures, the form of each slit is the form prolonged from the near side of the annular opening to the near side of another annular opening.

9 Claims, 13 Drawing Sheets

SELF-SEALING FLEXIBLE SEAL FOR SEALING INNER SURFACE OF TUBE AND MOVABLE BODY FOR INSIDE TUBE EQUIPPED WITH SAID SEAL

RELATED ART

This invention relates to a self-sealing type flexible seal which can adhere to an internal surface of a pipe even if a diameter of the pipe is changed variable.

This invention relates to a mobile crawler capable of moving along the surface of an internal pipe equipped with the self-sealing type flexible seal.

This invention is applied to a mobile crawler travels along the surface of an internal pipe in order to clean or to inspect the surface.

BACKGROUND ART

The application of this invention relates to a device capable of moving along the surface of an internal pipe, having a repair device/s that acts on the surface of the internal pipe, such a repair device may be a cleaning device to remove foreign matter such as rust or aquatic organisms attached to the internal pipe such as a clear-water pipe, drainage or gas pipe, and such a repair device also may be a coating device to spray coating material such as paint or corrosion resistant alloys to the surface of the internal pipe after removing the foreign matter.

As an example of the working devices described in the above, it was disclosed the "Working method for an internal pipe and working device for the same" described in Japan Patent Application Examined Publication No. 2003-225626. As another example of the working devices described in the above, it was disclosed the "PIG which inspects an internal pipe" described in Japan Patent Application Examined Publication No. H06-66776.

[Patent Reference 1]

Japan Patent Application Examined Publication No. 2003-225626

[Patent Reference 2]

Japan Patent Application Examined Publication No. H06-66776

DISCLOSURE OF THE INVENTION

In the known device to move along the internal pipe as the above-mentioned purpose, the inspection and cleaning of the surface of the pipe, it was necessary to replace the seal member that matches the inner diameter of the pipe when the diameter of the pipe is changed.

In the pipe where the inner diameter has a mix of different, it was difficult to move the device continuously along the internal pipe without replacing the seal member.

In the device of this kind is known, if the device comprises a flexible seal, such as the self-sealing type flexible seal of the present invention, its scope is expanding by leaps and bounds.

In the present invention, "self-sealing type flexible seal for an internal pipe" is provided with excellent features described below.

The flexible seal of the present invention can be used for the device which moves along the internal pipe for the purpose of the inspection and cleaning of the internal pipe.

Even if the inside diameter of the pipe changes, it can change the shape of the seal flexibly.

Moreover, the flexible seal of the present invention has a self-seal function.

That is, the seal of the present invention can be touched air-tightly to the inner surface of the pipe by using the pressure of the fluid which is surrounding the seal.

Furthermore, the flexible seal of the present invention completely has the same self-seal function and flexible function, when moving to the front, or when moving back along the internal pipe.

In the present invention, "Mobile crawler travels along the surface of an internal pipe" equipped with "self-sealing type flexible seal for an internal pipe" is provided.

In order to solve the technical problems described in the above, provided according to the first present invention as described in claim 1, comprising a self-sealing type flexible seal capable of moving along the surface of an internal pipe, comprising:

The flexible seal consists of the seal component A and the seal component B, and each shape of the seal component is hollow ball-like;

In the portion of two pole parts of the each seal component, there is one annular opening per pole;

The form of two seal components is similar figures, and two seal components are formed from a flexible material;

The seal component A is arranged on the outside of the seal component B,

The seal component A and the seal component B are arranged by a two-sheet pile, and are arranged in the state where it moreover contacted;

Each of the seal component A and the seal component B possesses the slits of N pieces which have similar figures, the form of each slit is the form prolonged from the near side of the annular opening to the near side of another annular opening;

Described about the phase angle which the seal component A and the seal component B constitute, the phase angle of the seal component A and the seal component B has shifted on the field which intersects the same central axis of the seal component A and the seal component B.

In order to solve the technical problems described in the above, provided according to the second present invention as described in claim 6, comprising a mobile crawler capable of moving along an internal pipe, comprising:

A self-sealing type flexible seal capable of moving along the surface of an internal pipe described in Claims 1 through 5;

The main unit of the mobile crawler;

The self-sealing type flexible seal equipped on the outer peripheral portion of the main unit of the mobile crawler so that the distance between one opening of the flexible seal and another opening of the flexible seal can be changed freely on the outer peripheral portion;

The opening of the flexible seal of the downstream side arranged so that it may touch air-tightly to the end part of the downstream side of the outer peripheral portion of the main unit of the mobile crawler.

Effects of the present invention will be explained below.

The present invention is to provide the self-sealing type flexible seal which can adhere to the internal surface of the pipe even if the diameter of the pipe is changed variable.

The self-sealing type flexible seal of the present invention is applied to the device which moves along the internal pipe in order to inspect and clean the surface of the pipe.

If the device comprises the flexible seal of the present invention, its scope is expanding by leaps and bounds.

Further, the present invention is to provide the "mobile crawler travels along the surface of the internal pipe" equipped with the "self-sealing type flexible seal for the internal pipe".

DESCRIPTIONS OF THE PREFERRED EMBODIMENTS

Preferred embodiments of the device configured according to the present invention will be described in detail below, referring to the figures attached hereto.

FIG. 1 through FIG. 8 show the first preferred embodiment of the "self-sealing type flexible seal for the internal pipe".

The flexible seal 20 consists of the seal component A 21 and the seal component B 22, and each shape of the seal component is hollow ball-like.

In the portion of two pole parts of the each seal component, there is one annular opening per pole.

The form of two seal components is similar figures, and two seal components are formed from a flexible material.

The seal component A 21 is arranged on the outside of the seal component B 22.

The seal component A 21 and the seal component B 22 are arranged by a two-sheet pile, and are arranged in the state where it moreover contacted.

Each of the seal component A 21 and the seal component B 22 possesses the slits 213 of N pieces which have similar figures, the form of each slit 213 is the form prolonged from the near side of the annular opening 212 to the near side of another annular opening 212.

Described about the phase angle which the seal component A 21 and the seal component B 22 constitute, the phase angle of the seal component A 21 and the seal component B 22 has shifted on the surface which intersects the same central axis of the seal component A 21 and the seal component B 22.

Described an example about the phase angle which the seal component A 21 and the seal component B 22 constitute, the phase angle of the seal component A and the seal component B has shifted about 180/N degrees on the surface which intersects the same central axis of the seal component A and the seal component B.

Described a concrete example about the phase angle which the seal component A 21 and the seal component B 22 constitute in the first preferred embodiment, the phase angle of the seal component A and the seal component B has shifted about 22.5 degrees because each of the seal component has eight slits 213, 223. The openings of the seal component A and the seal component B are unified by means, such as adhesion or welding, in order to fix the phase angle which the seal component A 21 and the seal component B 22 constitute.

Described each shape of the slits 213, 223 of the seal component A 21 and the seal component B 22, the slit begins to be formed from the point X near one opening, and the width of the slit becomes large as it approaches the equatorial part of the ball, and it becomes narrow as it approaches the point Y near the opening of another side.

As it is showed in FIG. 4, two or more tension coiled springs may be arranged between two openings of the flexible seal.

FIG. 8 shows the shape of the flexible seal 20 when the tension coiled springs 24 are contracted.

FIG. 8 also shows the shape of the flexible seal 20 at the normal condition of the seal.

FIG. 7 shows the shape of the flexible seal 20 when the tension coiled springs 24 are extended.

FIG. 9 shows the second preferred embodiment of the "self-sealing type flexible seal for the internal pipe".

Described the difference between the flexible seal 20 of the first preferred embodiment and the flexible seal 20 of the second preferred embodiment, only the shape of the slit differs.

Described the shape of the slit 213, 223 of the flexible seal 20 of the second preferred embodiment, being referred to as the surface X where there exist the main axis line and the point X of the seal component A 21, and the surface Y where there exist the main axis line and the point Y of the seal component B 22, the angle which the surface X and the surface Y intersect is approximately 50 degrees.

The angle which the surface X and the surface Y intersect may be set as 0 degrees or more.

It is caused by the purpose and the place in which the flexible seal of this invention is applied whether it must be set as 0 degrees or more the angle which the surface X and the surface Y intersect.

FIG. 10 through FIG. 11 show an overall view of the first preferred embodiment of this invention of the mobile crawler 2 and the devices accompanied with the mobile crawler 2.

The mobile crawler is equipped with the self-sealing type flexible seal of this invention and the mobile crawler moves along the internal pipe.

In FIG. 10, the first preferred embodiment of this invention of the mobile crawler 2 and the devices accompanied with the mobile crawler 2, comprising:

The mobile crawler 2 placed inside the pipe;

The hose 5, of which upstream end being connected to the mobile crawler 2, of which downstream end being connected to the upstream side inlet of the solid fluid separation device 4;

The roots type vacuum pump 3 as a type of the positive-displacement pumps, of which upstream inlet being connected to the downstream side outlet of the solid fluid separation device 4, of which downstream outlet being released into the space that surround the pipe 1;

The vacuum breaker 6, being connected to one end of the pipe wherein the hose 5 is not placed;

It should be noted that the self-sealing type flexible seal 20 divides the space inside the pipe 1 into space (A):A0 and space (B):B0.

The space (A) is connected to the vacuum breaker 6 and the hose 5 is placed in the space (B).

Another end of the pipe wherein placed of the hose 5 is released into the space that surround the pipe 1.

Described the composition of the mobile crawler 2 in FIG. 11, the mobile crawler 2 is comprised of the self-sealing type flexible seal 20 and the main unit 23 of the mobile crawler.

The self-sealing type flexible seal 20 is equipped on the outer peripheral portion of the main unit 23 of the mobile crawler 20 so that the distance between one opening 212 of the seal and another opening 212 of the seal can be changed freely on the outer peripheral portion.

The opening 212 of the seal of the downstream side arranged so that it may touch air-tightly to the end part of the downstream side of the outer peripheral portion of the main unit 23 of the mobile crawler.

Described more concretely about the matter above mentioned, the outer peripheral portion of the main unit 23 of the mobile crawler is composed of a cylindrical body such as a body of which shape is formed a round pipe or a squarely pipe, and each end part of two end parts of the cylindrical body is formed as a flange-like projection.

The flexible seal 20 is arranged between the two end parts of the cylindrical body.

Each inner edge of the openings 212 of the flexible seal can slide along the outside surface of the outer peripheral portion of the main unit 23 of the mobile crawler.

The mobile crawler 2 is connected to the roots type vacuum pump 3 through the hose 5.

The end part of the upstream side of the pipe is connected to a vacuum breaker 6.

Describes in detail the actions of the first preferred embodiment of the self-sealing type flexible seal 20 and the mobile crawler 2, referring to FIG. 10 through FIG. 11:

Being activated the roots type vacuum pump 3 having sufficient suction air volume, the air inside the space (A):A0 is sucked toward the downstream side—in other words—in the direction of the roots type vacuum pump 3, then the pressure in the space (A):A0 is reduced because the air inside the space (B):B0 is prevented to flow into the space (A):A0 by the action of the flexible seal 20. The free-end portion 202 of the flexible seal 20 is pushed strongly to the surface of the pipe 1 due to difference in pressure of the space (A):A0—vacuum pressure—and the space (B):B0—atmospheric pressure, thus there become a fewer the gaps between the surface of the pipe 1 and the flexible seal 20.

Thus, the pressure in the space (A):A0 is reduced to the set pressure of the vacuum breaker 6.

It is assumed that the set pressure of the vacuum breaker 6 is −200 mmHg.

The atmosphere of the inner space 203 of the flexible seal tends to be sucked out to the space (A):A0 through the narrow gap between the seal component A 21 and the seal component B 22, however it is prevented because the seal component B 22 is pressed strongly toward the seal component A 21, that power is showed by small arrows in FIG. 11.

The atmosphere in the space (B):B0 can change the shape of the seal component B 22 by pushing it toward the space 203, therefore the gap is made between the component A and the component B, and the atmosphere flows into the space 203 through the gap.

Thus, the pressure of the space 203 is maintained at the atmospheric pressure.

The black arrow 82 in FIG. 11 shows the direction where the atmosphere flows into the space 203.

Being reduced the pressure of the space (A):A0, the air inside the space (B):B0 flows into the space (A):A0 through a narrow gap between the surface of the pipe 1 and the free-end portion 202 of the flexible seal 20 as shown in FIG. 11.

Described below about the phenomenon to be caused by actual gap between the surface of the pipe 1 and the flexible seal 20, the high-speed air flow flows from the space (B):B0 into the space (A):A0 through the narrow gap due to the overlap parts of the seal component A 21 and the seal component B 22, and due to the irregularity and the wound formed by rust on the surface of the pipe 1 and the flexible seal 20.

Described the effect of the high-speed air flow, the dirt is cleaned and recovered from the surface of the pipe 1 and the wet surface of the pipe 1 is dried forcibly by the action of the high-speed air flow.

Described below the actions of the vacuum breaker 6 of FIG. 10 referring to the composition of the vacuum breaker 6 of FIG. 13 because both of the compositions are the same.

In the vacuum breaker 6 shown in FIG. 13, the atmosphere flowing into the vacuum breaker 6 due to that the pressure of the atmosphere overcomes power of compression coil spring 66 and pushes valve plate 64 open when the pressure of space (A):A0 becomes less than −200 mmHg, thus the pressure of space (A):A0 is maintained in −200 mmHg.

Described in FIG. 10, the mobile crawler 2 receives strong power to act on a course of space (B):B0 from space (A):A0 due to difference in pressure—200 mmHg—of the space (A):A0 and the space (B):B0.

The white arrow in the figure shows the directions that the power acts to the mobile crawler 2.

As to the means to make the mobile crawler to travel inside the pipe, the mobile crawler 2 is connected to the end of a wire rope 70 which is wound by a winch of which rotating speed is variable and the rotating direction is possible to change.

As to another means to make the mobile crawler to travel inside the pipe and to control the speed, it is possible to be used the well-known means in order to make the mobile crawler to travel inside the pipe and to control the speed.

When the mobile crawler 2 travels along the internal pipe that is configured according to the present invention, it is removed the foreign matter such as rust which adheres to the surface of the pipe, and it is cleaned the surface by means of rubbing the surface by the flexible seal during the travelling of the mobile crawler 2 along the internal pipe.

Being transferred the suction air from the vacuum breaker 6 to the roots type vacuum pump 3 through the space (A):A0, the space (B):B0, the hose 5 and the solid fluid separator 4, the clean air is released into the atmosphere from the exit of the roots type vacuum pump 3 after separated the air from the removed particle and the by the solid-fluid separator 4.

FIG. 12 through FIG. 13 show an overall view of the second preferred embodiment of this invention of the mobile crawler 2 and the devices accompanied with the mobile crawler 2.

The mobile crawler is equipped with the self-sealing type flexible seal of this invention and the mobile crawler moves along the internal pipe.

In FIG. 12, the second preferred embodiment of this invention of the mobile crawler 2 and the devices accompanied with the mobile crawler 2, comprising:

The mobile crawler 2 equipped with the vacuum breaker 6 being placed inside the pipe;

The hose 5, of which upstream end being connected to the end of the pipe 1, of which downstream end being connected to the upstream side inlet of the solid fluid separation device 4;

The roots type vacuum pump 3 as a type of the positive-displacement pumps, of which upstream inlet being connected to the downstream side outlet of the solid fluid separation device 4, of which downstream outlet being released into the space that surround the pipe 1;

It should be noted that the self-sealing type flexible seal 20 divides the space inside the pipe 1 into space (A):A0 and space (B):B0.

The space (A) is connected to the roots type vacuum pump 3 and the hose 5 is placed in the space (B).

Described the composition of the mobile crawler 2 in FIG. 13, the mobile crawler 2 is comprised of the self-sealing type flexible seal 20 and the main unit 23 of the mobile crawler.

The self-sealing type flexible seal 20 is equipped on the outer peripheral portion of the main unit 23 of the mobile crawler 20 so that the distance between one opening 212 of the seal and another opening 212 of the seal can be changed freely on the outer peripheral portion.

The opening 212 of the seal of the downstream side arranged so that it may touch air-tightly to the end part of the downstream side of the outer peripheral portion of the main unit 23 of the mobile crawler.

Described more concretely about the matter above mentioned, the outer peripheral portion of the main unit 23 of the mobile crawler is composed of a cylindrical body such as a body of which shape is formed a round pipe or a squarely pipe, and each end part of two end parts of the cylindrical body is formed as a flange-like projection.

The flexible seal 20 is arranged between the two end parts of the cylindrical body.

Each inner edge of the openings 212 of the flexible seal can slide along the outside surface of the outer peripheral portion of the main unit 23 of the mobile crawler.

The mobile crawler 2 is equipped with the vacuum breaker 6.

Describes in detail the configuration of well-known vacuum breaker 6, referring to FIG. 13, comprising:

Vacuum breaker 6 is comprised of a valve case 63 with a hose coupling 62 of downstream side and with a valve hole 61 of upstream side, a valve plate 64 placed inside the valve case 63, a valve rod 65 fixed to the valve plate 64, and a compression coil spring 66 pushing the valve plate 64 to the valve hole 61 strongly.

Describes in detail the actions of the second preferred embodiment of the self-sealing type flexible seal 20 and the mobile crawler 2, referring to FIG. 12 through FIG. 13:

Being activated the roots type vacuum pump 3 having sufficient suction air volume, the air inside the space (B):B0 is sucked toward the downstream side—in other words—in the direction of the roots type vacuum pump 3, then the pressure in the space (A):A0 is reduced because the air inside the space (B):B0 is prevented to flow into the space (A):A0 by the action of the flexible seal 20.

The free-end portion 202 of the flexible seal 20 is pushed strongly to the surface of the pipe 1 due to difference in pressure of the space (A):A0—vacuum pressure—and the space (B):B0—atmospheric pressure, thus there become a fewer the gaps between the surface of the pipe 1 and the flexible seal 20.

Thus, the pressure in the space (A):A0 is reduced to the set pressure of the vacuum breaker 6.

It is assumed that the set pressure of the vacuum breaker 6 is −200 mmHg.

The atmosphere of the inner space 203 of the flexible seal tends to be sucked out to the space (A):A0 through the narrow gap between the seal component A 21 and the seal component B 22, however it is prevented because the seal component B 22 is pressed strongly toward the seal component A 21, that power is showed by small arrows in FIG. 11.

The atmosphere in the space (B):B0 can change the shape of the seal component B 22 by pushing it toward the space 203, therefore the gap is made between the component A and the component B, and the atmosphere flows into the space 203 through the gap.

Thus, the pressure of the space 203 is maintained at the atmospheric pressure.

The black arrow 82 in FIG. 11 shows the direction where the atmosphere flows into the space 203.

Being reduced the pressure of the space (B):B0, the air inside the space (B):B0 flows into the space (A):A0 through a narrow gap between the surface of the pipe 1 and the free-end portion 202 of the flexible seal 20 as shown in FIG. 13.

Described below about the phenomenon to be caused by actual gap between the surface of the pipe 1 and the flexible seal 20, the high-speed air flow flows from the space (B):B0 into the space (A):A0 through the narrow gap due to the overlap parts of the seal component A 21 and the seal component B 22, and due to the irregularity and the wound formed by rust on the surface of the pipe 1 and the flexible seal 20.

Described the effect of the high-speed air flow, the dirt is cleaned and recovered from the surface of the pipe 1 and the wet surface of the pipe 1 is dried forcibly by the action of the high-speed air flow.

Described below the actions of the vacuum breaker 6 in FIG. 10 referring to the composition of the vacuum breaker 6 in FIG. 13;

The compositions of the vacuum breaker 6 in FIG. 10 and in FIG. 13 are the same.

In the vacuum breaker 6 shown in FIG. 13, the atmosphere flowing into the vacuum breaker 6 due to that the pressure of the atmosphere overcomes power of compression coil spring 66 and pushes valve plate 64 open when the pressure of space (A):A0 becomes less than −200 mmHg, thus the pressure of space (A):A0 is maintained in −200 mmHg.

Described in FIG. 10, the mobile crawler 2 receives strong power to act on a course of space (B):B0 from space (A):A0 due to difference in pressure—200 mmHg—of the space (A):A0 and the space (B):B0.

The white arrow in the figure shows the directions that the power acts to the mobile crawler 2.

As to the means to make the mobile crawler to travel inside the pipe, the mobile crawler 2 is connected to the end of a wire rope 70 which is wound by a winch of which rotating speed is variable and the rotating direction is possible to change.

As to another means to make the mobile crawler to travel inside the pipe and to control the speed, it is possible to be used the well-known means in order to make the mobile crawler to travel inside the pipe and to control the speed.

The preferred embodiments of the present invention are described in the above, however it is possible to conceive the other various embodiments based on the scope of the claims.

The descriptions in the above of the preferred embodiments of the present invention assumed that the device of the present invention existed in the atmosphere, but the device of the present invention may be applied underwater.

This invention relates to the self-sealing flexible seal of the mobile crawler capable of moving along the surface of an internal pipe, having a repair device/s that acts on the surface of the internal pipe, such a repair device may be a cleaning device to remove foreign matter such as rust or aquatic organisms attached to the internal pipe such as a clear-water pipe, drainage or gas pipe, and such a repair device also may be a coating device to spray coating material such as paint or corrosion resistant alloys to the surface of the internal pipe after removing the foreign matter.

This invention also relates to the mobile crawler having the self-sealing flexible seal capable of changing the shape of the seal flexibly even if the inside diameter of the pipe changes.

REFERENCE NUMERALS OR MARKES

Figure 1:
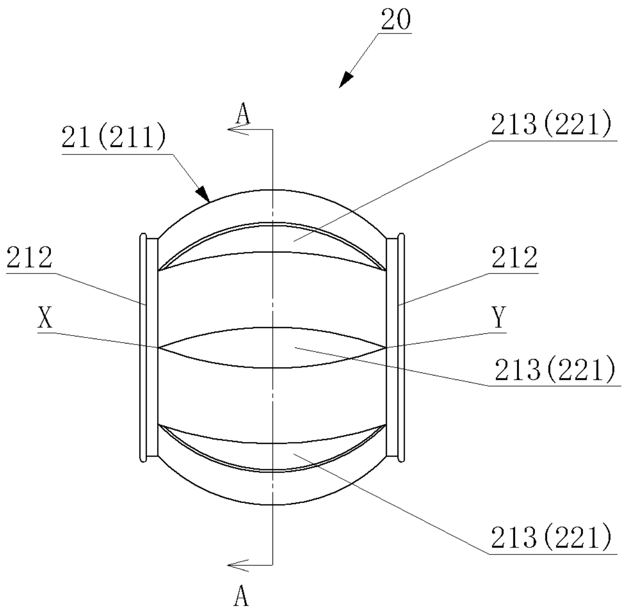
FIG. 1 is a front view of the first preferred embodiment of the self-sealing flexible seal and the seal component A configured according to the present invention.
Figure 2:
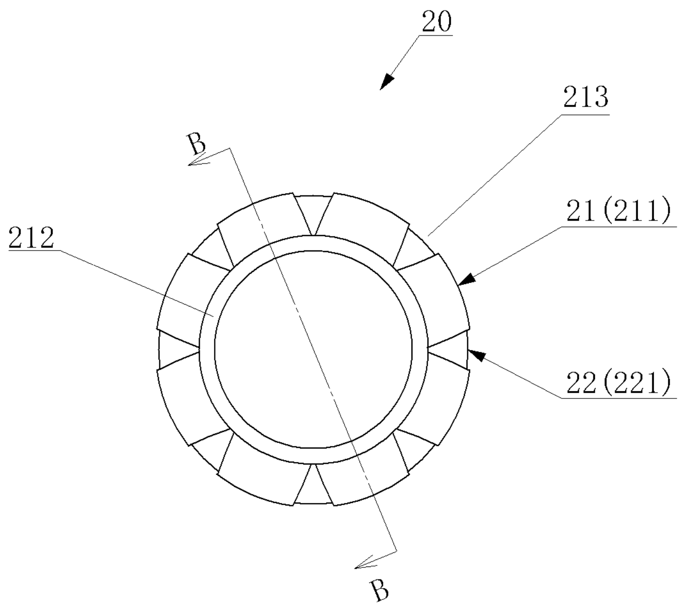
FIG. 2 is a side view of the self-sealing flexible seal shown in FIG. 1.
Figure 3:
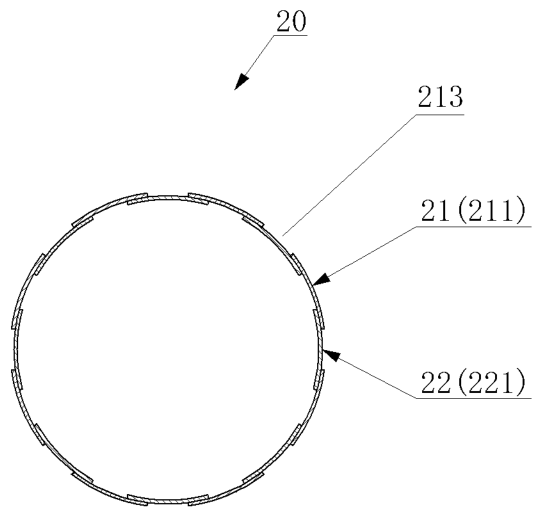
FIG. 3 is a section view from the arrows A-A of the self-sealing flexible seal shown in FIG. 1.
Figure 4:
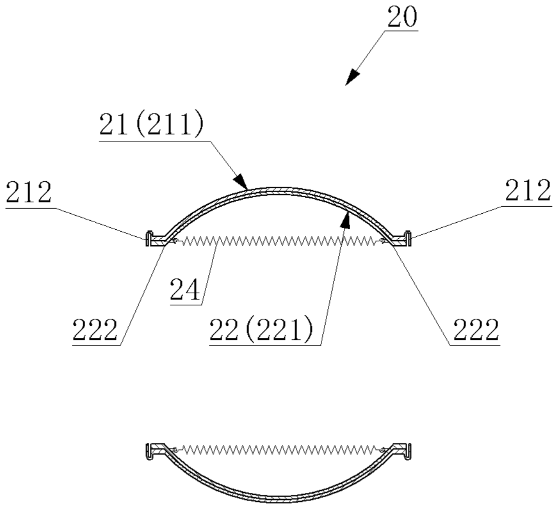
FIG. 4 is a section view from the arrows B-B of the self-sealing flexible seal shown in FIG. 2.
Figure 5:
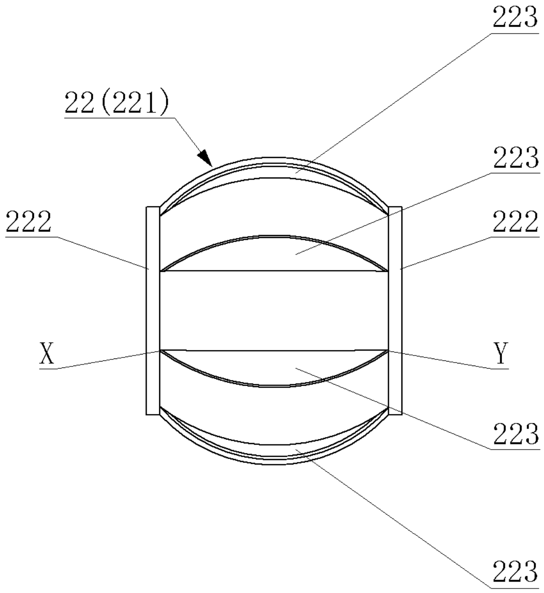
FIG. 5 is a front view of the seal component B which consists of the self-sealing flexible seal.
Figure 6:
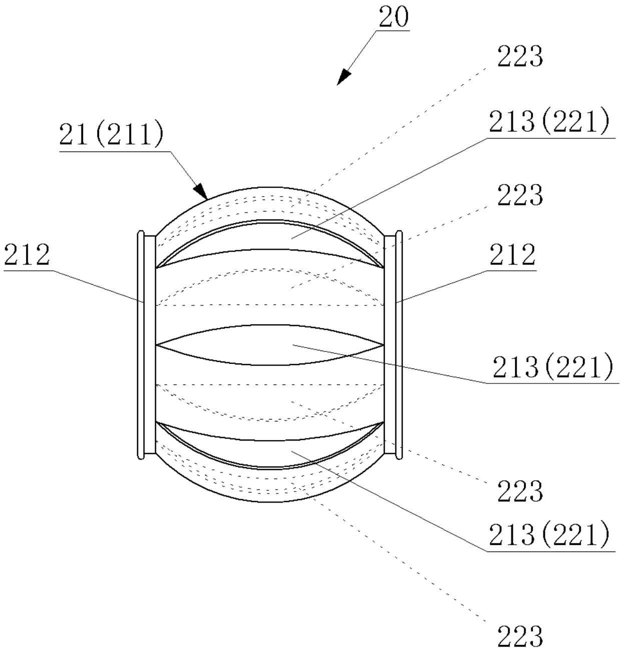
FIG. 6 is a front view of the self-sealing flexible seal which shows the relationship between the relative position of the seal component A shown in FIG. 1 and the seal component B shown in FIG. 5.
Figure 7:
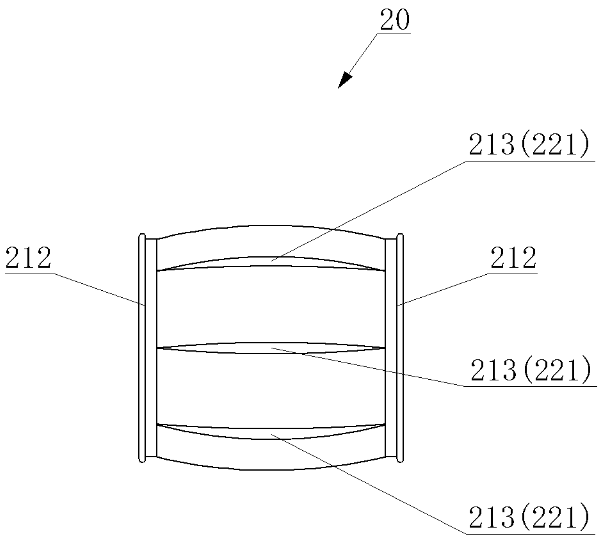
FIG. 7 is a front view of the self-sealing flexible seal which shows the state where the seal is extended along the central axis of the seal.
Figure 8:
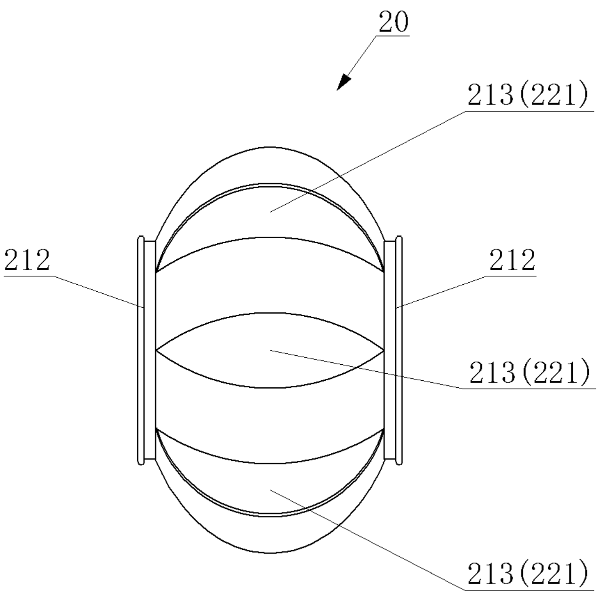
FIG. 8 is a front view of the self-sealing flexible seal which shows the state where the seal is contracted along the central axis of the seal.
Figure 9:
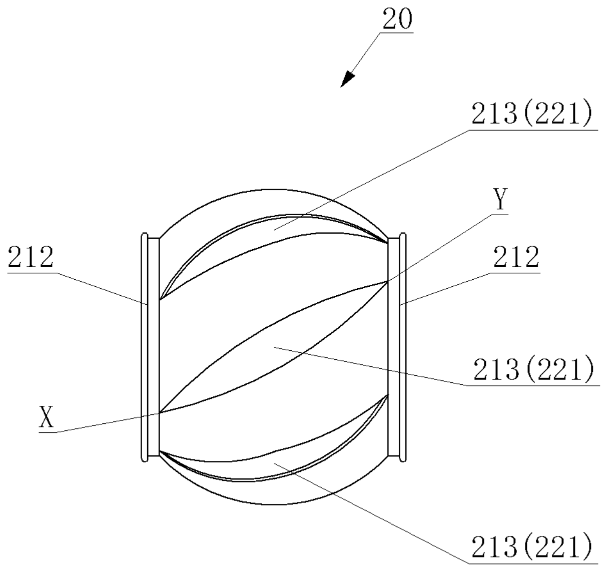
FIG. 9 is a front view of the second preferred embodiment of the self-sealing flexible seal configured according to the present invention.
Figure 10:
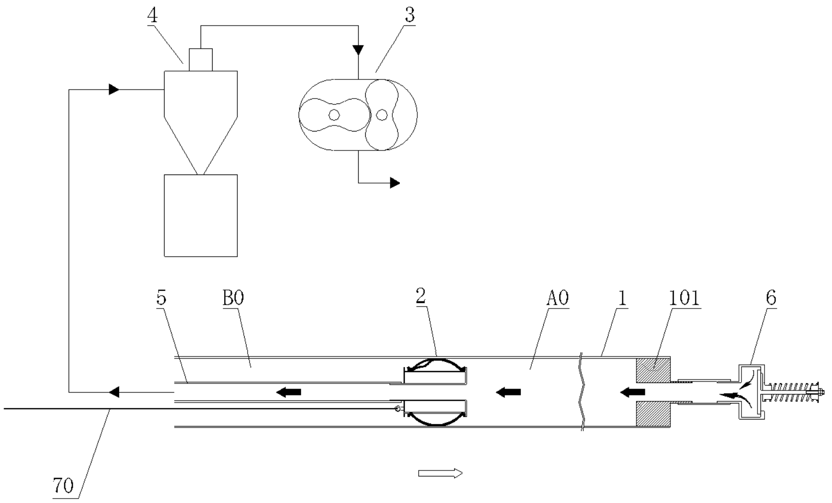
FIG. 10 is an overall view of the first preferred embodiment which shows the mobile crawler of the internal pipe equipped with the self-sealing flexible seal configured according to the present invention, and shows the configuration of the devices attached to the mobile crawler of the internal pipe.
Figure 11:
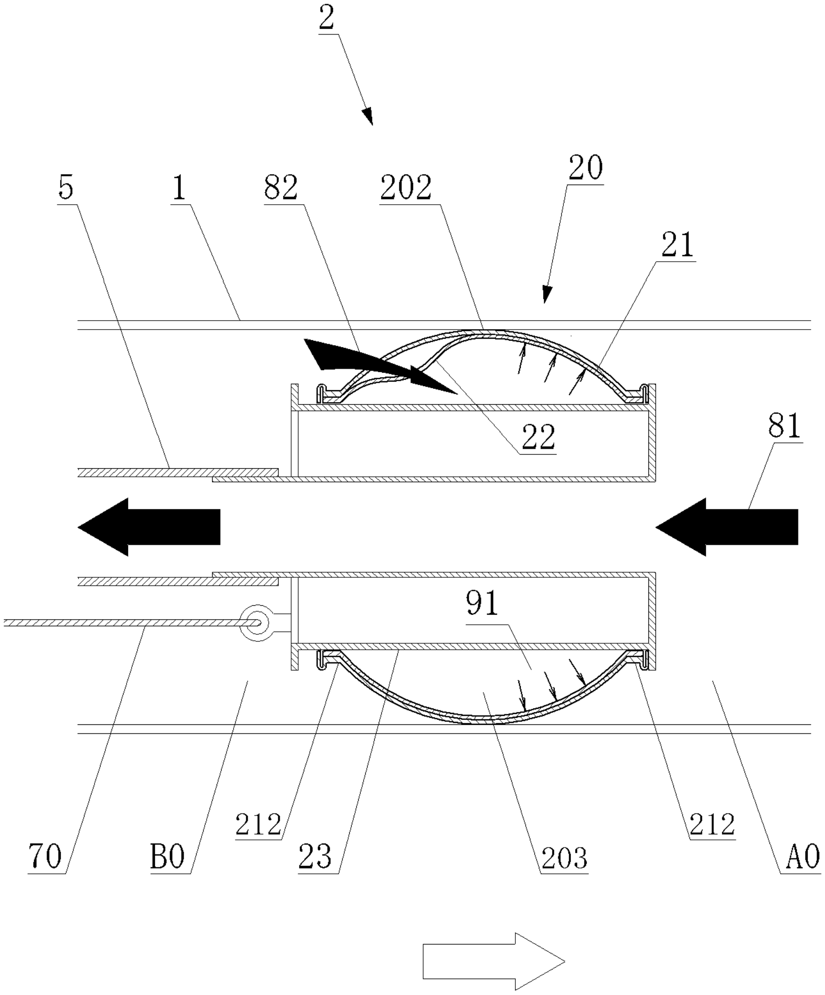
FIG. 11 is an enlarged section view of the mobile crawler of the internal pipe shown in FIG. 10.
Figure 12:
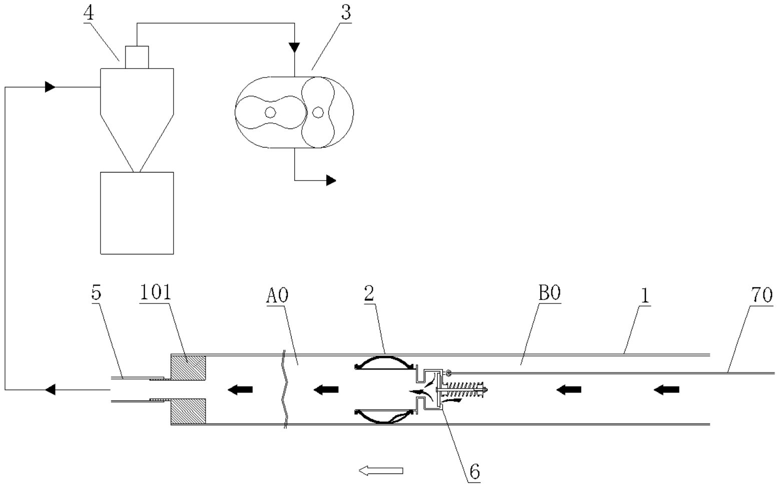
FIG. 12 is an overall view of the second preferred embodiment which shows the mobile crawler of the internal pipe equipped with the self-sealing flexible seal configured according to the present invention, and shows the configuration of the devices attached to the mobile crawler of the internal pipe.
Figure 13:
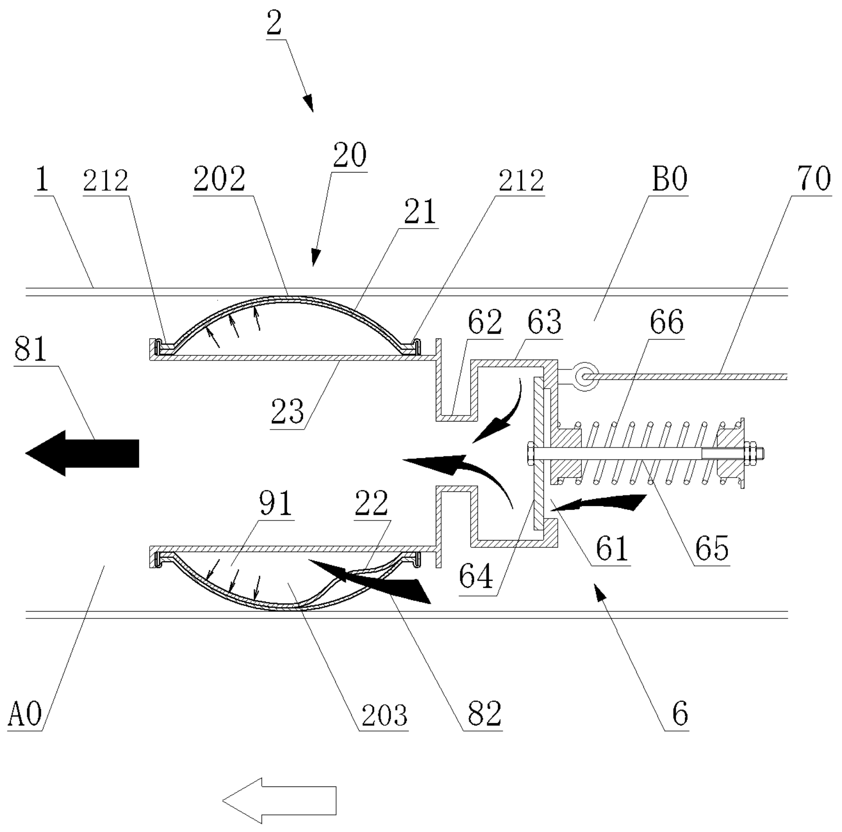
FIG. 13 is an enlarged section view of the mobile crawler of the internal pipe shown in FIG. 12.

A0 space(A); B0 space(B); 1 pipe; 101 end plug of pipe; 2 mobile crawler of the internal pipe; 3 roots type pump; 4 solid fluid separation device; 5 hose; 6 vacuum breaker; 61 upstream side valve hole; 62 downstream side hose connector; 63 valve case; 64 valve plate; 65 valve rod fixed to valve plate; 66 compression coil spring; 20 self-sealing type flexible seal; 202 free-end portion; 203 space inside the flexible seal; 21 seal component A; 211 main part of the seal; 212 opening; 213 slit; 22 seal component B; 221 main part of the seal; 222 opening; 223 slit; 23 main unit of the mobile crawler; 24 tension coiled springs; 70 wire rope; 81 flow of the fluid toward to roots pump; 82 flow of the fluid enter the space inside of the self-sealing flexible seal.

The invention claimed is:

1. A self-sealing flexible seal capable of moving along a surface of an internal pipe, comprising:

a first seal component having a hollow ball shape and one annular opening at a pole part thereof, said first seal component being formed of a flexible material; and a second seal component having a hollow ball shape and one annular opening at a pole part thereof facing the pole part of the first seal component, said second seal component being formed of a flexible material and having a shape similar to that of the first seal component, wherein said first seal component is arranged on an outer surface of the second seal component and said second seal component is arranged on an inner surface of the first seal component to closely contact with the first seal component, each of said first seal component and said second seal component includes a plurality of slit pieces in a number of N having a similar shape and extending from a near side of one of the annular openings to a near side of the other of the annular openings, and said first seal component and said second seal component are arranged so that the first seal component is shifted relative to the second seal component on a plane intersecting a central axis of the first seal component and the second seal component by a phase angle between the first seal component and the second seal component.

2. The self-sealing flexible seal capable of moving along the surface of the internal pipe according to claim 1, wherein said first seal component and said second seal component are arranged so that the phase angle between the first seal component and the second seal component is about 180/N degrees on the plane intersecting the central axis of the first seal component and the second seal component.

3. The self-sealing flexible seal capable of moving along the surface of the internal pipe according to claim 1, wherein said first seal component and said second seal component have the annular openings unified by means including adhesion or welding.

4. The self-sealing flexible seal capable of moving along the surface of the internal pipe according to claim 1, wherein each of said first seal component and said second seal component includes the slit pieces extending from a first point near the one of the annular openings, and said slit pieces have a width increasing toward an equatorial part of the hollow ball shape, and decreasing toward a second point near the other of the annular openings.

5. The self-sealing flexible seal capable of moving along the surface of the internal pipe according to claim 1, wherein said first seal component and said second seal component are arranged so that the central axis of the first seal component and the second seal component and the point are situated on a first surface and the second point is situated on a second surface, said first surface being inclined relative to the second surface by an angle equal to or greater than 0 degree.

6. A movable body capable of moving along an internal pipe, comprising:

the self-sealing flexible seal capable of moving along the surface of the internal pipe according to claim 1; and a main unit;

wherein said self-sealing flexible seal is disposed on an outer peripheral portion of the main unit so that a distance between the one of the annular openings and the other of the annular openings can be changed freely, said one of the annular openings is situated on a downstream side to contact air-tightly with an end part of the outer peripheral portion on the downstream side.

7. The movable body capable of moving along the internal pipe according to claim 6, wherein said outer peripheral portion of the main unit includes a cylindrical body having a round pipe shape or a squarely pipe shape and a flange-shaped projection situated at each of end parts of the cylindrical body, wherein said self-sealing flexible seal is arranged between the two end parts of the cylindrical body, and each of said annular openings has an inner edge arranged to be slidable along an outside surface of the cylindrical body.

8. The movable body capable of moving along the internal pipe according to claim 6, wherein said main unit is connected to a negative pressure generating device through a hose so that an end part of the internal pipe on an upstream side is connected to a vacuum breaker.

9. The movable body capable of moving along the internal pipe according to claim 6, wherein said main unit is connected to a vacuum breaker so that an end part of the internal pipe on the downstream side is connected to a negative pressure generating device.

* * * * *